(No Model.)
J. H. REED.
Penmanship Instructing Chart.
No. 230,817. Patented Aug. 3, 1880.
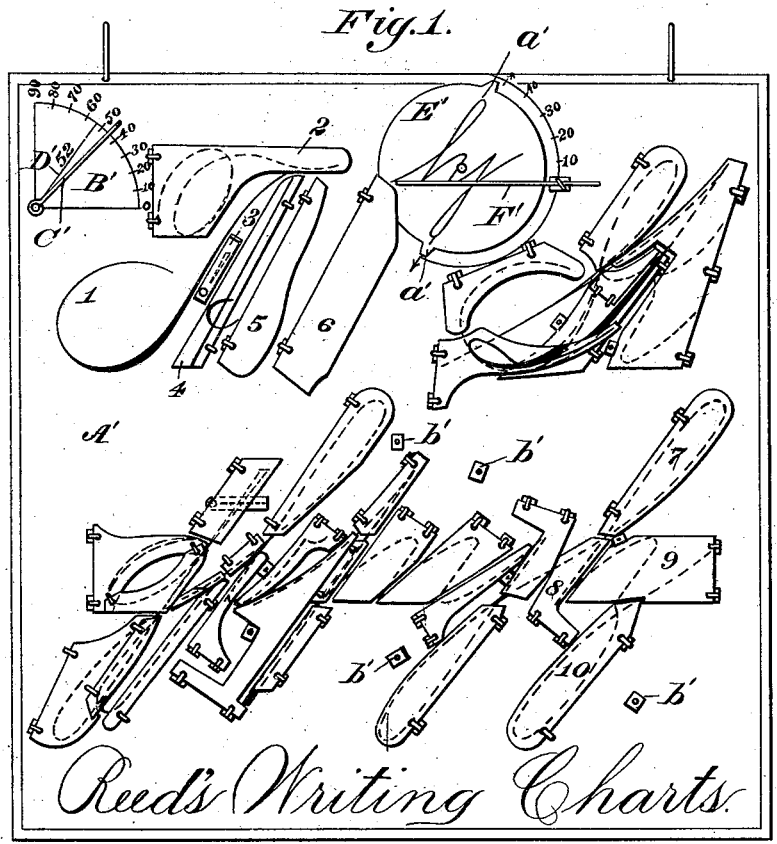
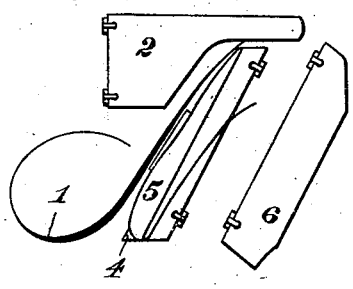 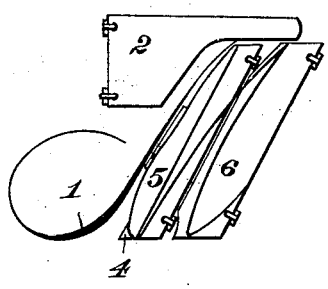
WITNESSES:
Donn P. Twitchell.
C. Sedgwick
INVENTOR:
J. H. Reed
BY Munn & Co.
ATTORNEYS.

UNITED STATES PATENT OFFICE.

JOHN H. REED, OF COWLES, NEBRASKA.

PENMANSHIP-INSTRUCTING CHART.

SPECIFICATION forming part of Letters Patent No. 230,817, dated August 3, 1880.

Application filed March 22, 1880. (No model.)

*To all whom it may concern:*

Be it known that I, JOHN H. REED, of Cowles, Webster county, State of Nebraska, have invented a new and Improved Penmanship-Instructing Chart, of which the following is a specification.

The object of my invention is to provide a new and improved penmanship - instructing chart, which will permit persons who are not good penmen themselves to instruct others in the art of penmanship and to explain the proper formation and inclination of letters.

The invention consists in a chart upon which the letters are written, which chart is provided with a series of hinged or sliding covers or darkeners having parts of the letters written upon one side, so that letters are formed by giving the covers the various positions they can assume in relation to each other.
The invention also consists of a revolving disk and a quadrant upon the chart, which show a correct inclination of the letters.

In the accompanying drawings, Figure 1 is a front elevation of my improved chart, containing part of the letters of the alphabet. Figs. 2 and 3 are detail views, showing the formation of the capitals A, T, F, M, and N.

Similar letters of reference indicate corresponding parts.

Upon a chart, A', a series of letters are written, and adjoining these letters darkeners or covers 1 2 3 4, &c., are pivoted or hinged in some suitable manner. The charts and their covers will preferably be painted black, and the letters will be written with white paint; but black letters upon a white chart will answer equally as well.

B' is a quadrant divided into spaces of ten degrees, and is provided with a hand, C', pivoted at the center of the circle, and with a line, D', drawn from the center with an inclination of fifty-two degrees to the horizontal plane, and shows the proper inclination of the letters.

A disk, E', provided with two projections, a' a', is centrally pivoted on the chart A', and is surrounded by a circular line having the subdivisions of the quadrant marked thereon. A wire, F', indicates the horizontal plane.

If the capital stem "l" is written on the chart several other letters can be formed by folding the covers the different ways. For instance, if the cover 2 is rotated in the plane at right angles to the chart from right to left it will expose the top transverse curve that was covered by the cover 2, and thus the letter "T" is formed. If the cover 3 is rotated in the plane of the chart from left to right the central transverse line of the letter "F" is thus exposed and this letter is formed. If the covers 2 and 3 are returned to their former positions and the cover 4 is rotated in the plane at right angles to the chart from right to left the letter "A" will be formed, the capital stem "l" forming one side of it, and the inclined straight line on the under side of the cover 4 forming the other side. If the cover 5 is now folded down over the cover 4 the letter "N" will be formed by the capital stem "l" and the two lines on the back of the cover 5, as is shown in Fig. 2. If the cover 6 is folded down from right to left the letter "M" will be formed out of the letter "N" by the two lines on the back of the cover 6. In the same manner other capital letters having like construction and formation are combined, so as to illustrate the manner in which one can be formed out of the other. The small letters can be formed in a like manner. For instance, by folding the cover F from right to left and the cover 8 from top to bottom an "l" is formed. By folding the cover 9 from left to right an "h" is formed, the covers 7 and 8 remaining folded, as stated above. By folding covers 7 and 8 back again to the former position and folding the cover 10 from left to right the letter "z" is formed.
All letters must have an inclination of fifty-two degrees to the horizontal plane, and therefore the line D' is drawn with this inclination, thus serving as a guide to show whether the inclination of certain letters is correct or not. By placing the pivoted hand C' parallel with the letter the inclination of the same can be seen on the scale of the quadrant. The revolving disk E' is for the same purpose, for if the letters on the disk have the proper inclination the projections a' a' must be at fifty-two degrees of the quadrant scale, and the lines upon which the letters are written must be parallel with the wire F'.

The chart can be made of pasteboard, wood, or metal, and can be of any desired size, as circumstances may require. A number of rubber or other springs, $b'\ b'$, serve to hold the covers down on the charts.

Having thus described my invention, I claim as new and desire to secure by Letters Patent—

1. A penmanship-instructing chart made substantially as herein shown and described, and consisting of a chart having letters written thereon, and provided with a series of covers adjoining the letters, whereby several letters can be formed by folding down the covers in their several positions in relation to each other, as set forth.

2. In a penmanship-instructing chart, the revolving disk $E'$, provided with one or more projections, $a'$, in combination with a curved subdivided line surrounding the same, as set forth.

3. The combination, with the chart $A'$, of a series of covers having parts of letters written on one side, substantially as herein shown and described, and for the purpose set forth.

4. The method, substantially as herein shown and described, of instructing in penmanship, consisting in forming the letters by means of covers which cover parts of the letters on a chart and have parts of letters written on their rear side, as set forth.

5. The combination, with the chart $A'$, provided with hinged covers, of the quadrant $B'$ and the pivoted hand $C'$, substantially as herein shown and described.

6. The method, substantially as herein shown and described, of showing the proper inclination of letters, consisting in rotating the hand $C'$ until parallel with the letter and then noting the difference between the inclination of the hand $C'$ and the line $D'$, which has an inclination of fifty-two degrees to the horizontal plane, as set forth.

JOHN HENRY REED.

Witnesses:
CORYDON CRAW,
H. J. HALBERT.